United States Patent
Chassin et al.

(10) Patent No.: US 12,481,248 B2
(45) Date of Patent: Nov. 25, 2025

(54) METHOD FOR MANUFACTURING HOROLOGICAL BALANCE SPRINGS

(71) Applicant: NIVAROX-FAR S.A., Le Locle (CH)

(72) Inventors: Geoffrey Chassin, Morteau (FR); Pierre Cusin, Villars-Burquin (CH)

(73) Assignee: NIVAROX-FAR S.A., Le Locle (CH)

( * ) Notice: Subject to any disclaimer, the term of this patent is extended or adjusted under 35 U.S.C. 154(b) by 0 days.

(21) Appl. No.: 18/941,193

(22) Filed: Nov. 8, 2024

(65) Prior Publication Data

US 2025/0199476 A1 Jun. 19, 2025

(30) Foreign Application Priority Data

Dec. 19, 2023 (EP) .................................. 23217974

(51) Int. Cl.
*G04B 17/06* (2006.01)
*G04D 7/10* (2006.01)

(52) U.S. Cl.
CPC ............. *G04B 17/066* (2013.01); *G04D 7/10* (2013.01); *Y10T 29/49579* (2015.01); *Y10T 29/49609* (2015.01)

(58) Field of Classification Search
CPC ............. G04B 17/066; Y10T 29/49609; Y10T 29/49579
See application file for complete search history.

(56) References Cited

U.S. PATENT DOCUMENTS

| | | | |
|---|---|---|---|
| 6,843,594 B1* | 1/2005 | Moteki | F03G 1/02 267/272 |
| 11,709,431 B2* | 7/2023 | Tobenas Borron | G04D 7/10 355/53 |

FOREIGN PATENT DOCUMENTS

| | | |
|---|---|---|
| CH | 719 688 A2 | 11/2023 |
| EP | 3 982 205 A1 | 4/2022 |

OTHER PUBLICATIONS

English Machine Translation of CH-719668-A2 (Year: 2023).*
European Search Report for 23 21 7974 dated Apr. 25, 2024.

* cited by examiner

*Primary Examiner* — Sarang Afzali
(74) *Attorney, Agent, or Firm* — Sughrue Mion, PLLC

(57) ABSTRACT

There is provided a method for manufacturing a batch of horological balance springs (2a), the average of whose stiffnesses lies within a predetermined range, and the method includes forming in a wafer the horological balance springs (2b, 2c) with dimensions that differ from the dimensions required to obtain the batch of horological balance springs (2a), the average of whose stiffnesses lies within the predetermined range, determining the stiffnesses of the systems, computing a dimensional correction to be applied to the horological balance springs, and modifying the dimensions of the horological balance springs (2b, 2c) formed, on the basis of a dimensional correction computed to obtain the batch of horological balance springs (2a).

12 Claims, 2 Drawing Sheets

METHOD FOR MANUFACTURING HOROLOGICAL BALANCE SPRINGS

CROSS REFERENCE TO RELATED APPLICATIONS

This application claims priority from European Patent Application No. 23217974.7 filed Dec. 19, 2023, the content of all of which is incorporated herein by reference in its entirety.

TECHNICAL FIELD OF THE INVENTION

The present invention relates to the field of manufacturing timepiece components. More specifically, the invention relates to a method for manufacturing a batch of horological balance springs, the average of whose stiffnesses lies within a predetermined range.

TECHNOLOGICAL BACKGROUND

Prior art documents describe using methods for manufacturing horological balance springs in wafers using etching techniques such as laser etching, plasma etching, deep reactive-ion etching (DRIE) or wet etching.

However, the use of such methods typically results in geometric dispersion between the balance springs, which are all formed in the same pattern on the same wafer.

To overcome these drawbacks, solutions have been proposed in prior art documents, in particular in European patents EP3181938 and EP 3181939, which describe methods for manufacturing balance springs.

In European patent EP 3181938, the manufacturing method comprises the following steps of: a) forming a balance spring of dimensions greater than the dimensions necessary to obtain a balance spring of a predetermined stiffness, b) determining the stiffness of the balance spring formed in step a) by measuring the frequency of the balance spring coupled with a balance having a predetermined inertia, c) computing the thickness of material to be removed in order to obtain the balance spring of a predetermined stiffness and d) removing from the balance spring formed in step a) the computed thickness of material, steps b), c) and d) being repeatable to further improve dimensional quality.

In European patent EP 3181939, the manufacturing method comprises the following steps of: a) forming a balance spring of dimensions smaller than the dimensions necessary to obtain a balance spring of a predetermined stiffness, b) determining the stiffness of the balance spring formed in step a) by measuring the frequency of the balance spring coupled with a balance having a predetermined inertia, c) computing the missing thickness of material that must be added in order to obtain the balance spring of a predetermined stiffness and d) modifying the balance spring formed in step a) to compensate for the missing thickness of material, steps b), c) and d) being repeatable to further improve dimensional quality.

Such methods can be improved, in particular to limit contamination of the wafer that can occur during the measurement step implemented therein.

In these circumstances, it is understood that there is a need to find solutions that will lead to such an improvement.

SUMMARY OF THE INVENTION

One aim of the present invention is to propose a method for manufacturing a batch of horological balance springs that meets the above-mentioned requirements.

Another aim is to improve precision during the manufacture of the batch of horological balance springs, the average of whose stiffnesses lies within a predetermined range.

The invention relates to a method for manufacturing a batch of horological balance springs, the average of whose stiffnesses lies within a predetermined range, which method comprises the following steps of:

a) forming, in a wafer, the horological balance springs with dimensions that differ from the dimensions required to obtain the batch of horological balance springs, the average of whose stiffnesses lies within said predetermined range;

b) forming, in the wafer, systems for indicating a reference stiffness for determining the stiffnesses of the horological balance springs, the average whereof lies within said predetermined range;

c) determining the stiffnesses of said systems formed;

d) computing a dimensional correction to be applied to the horological balance springs formed, on the basis of the determined stiffnesses of said systems;

e) modifying the dimensions of the horological balance springs formed, on the basis of a dimensional correction computed to obtain the batch of horological balance springs, the average of whose stiffnesses lies within said predetermined range.

In other embodiments:

the steps of forming the batch of horological balance springs and said systems are carried out by etching, in particular by deep reactive-ion etching;

In the formation step, each system is produced in the wafer for one balance spring of the batch of horological balance springs;

the step of forming said systems provides for the production, in the wafer, of a plurality of oscillating elements constituting each system surrounding the balance spring with which this system is associated in the wafer;

the step of forming said systems provides for the production, in the wafer, of a single oscillating element constituting each system in the vicinity of the balance spring with which this system is associated in the wafer;

the determination step comprises a sub-step of estimating at least one resonant frequency of each system associated with a balance spring of the batch of horological balance springs;

the determination step comprises a sub-step defining the stiffness of each system using an electronic device executing an algorithm for computing this stiffness on the basis of the estimated resonant frequency;

the stiffness defined for each system is the stiffness of one of its oscillating elements, the average stiffness of all of its oscillating elements or the average stiffness of a sample of its oscillating elements;

the computing step comprises a sub-step of determining, from the determined stiffness, a thickness of material to be added to or removed from at least one dimension of the balance spring of the batch of horological balance springs;

the oscillating element is shaped like a tuning fork.

BRIEF DESCRIPTION OF THE FIGURES

Other features and advantages of the invention will be better understood upon reading the following description given of a non-limiting specific embodiment of the invention, provided for illustration purposes with reference to the accompanying figures, in which.

DETAILED DESCRIPTION OF THE INVENTION

Figure 6:
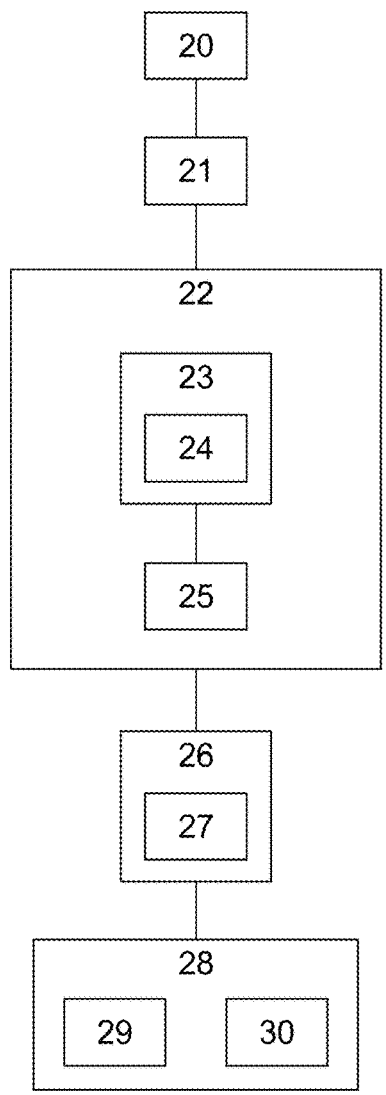
FIG. 6 is a logic diagram relating to a method for manufacturing a batch of horological balance springs, the average of whose stiffnesses lies within a predetermined range, in accordance with embodiments of the invention.

FIG. 6 diagrammatically shows the method for manufacturing a batch or a set of horological balance springs $2a$, the average of whose stiffnesses lies within a predetermined range. The aim of such a method is to ensure a very high dimensional accuracy of the balance springs $2a$ manufactured and, incidentally, to guarantee a more precise stiffness of these balance springs $2a$.

Figure 1:
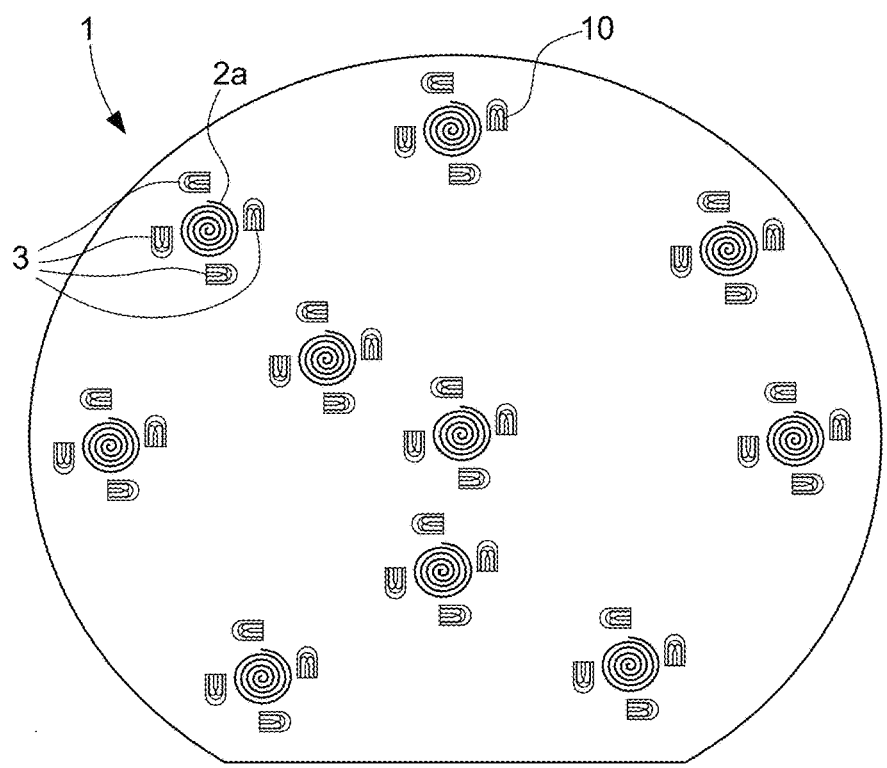
FIG. 1 is a diagrammatic view of a wafer comprising a batch of horological balance springs which have been formed at the same time, in particular by etching, all in this wafer, according to embodiments of the invention.
Figure 2:
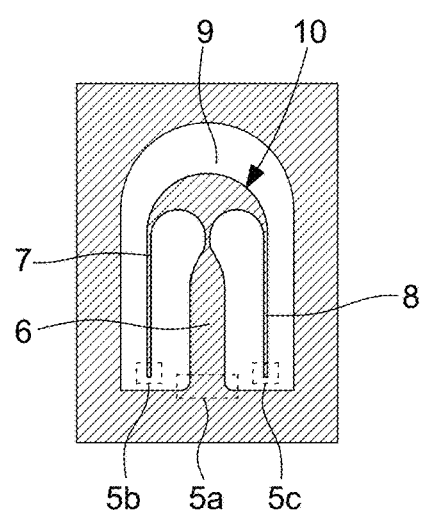
FIG. 2 is a larger-scale view of an oscillating element of a system for indicating a reference stiffness, this system being included in the wafer shown in FIG. 1, according to the embodiments of the invention.
Figure 3:
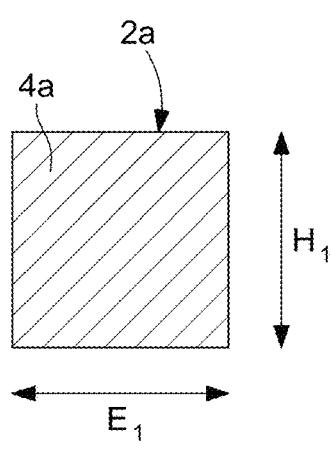
FIG. 3 is a diagrammatic view of a cross-section of a blade of the balance spring manufactured using the method, the cross-section having the dimensions required to obtain the batch of horological balance springs, the average of whose stiffnesses lies within the predetermined range, according to embodiments of the invention.
Figure 4:
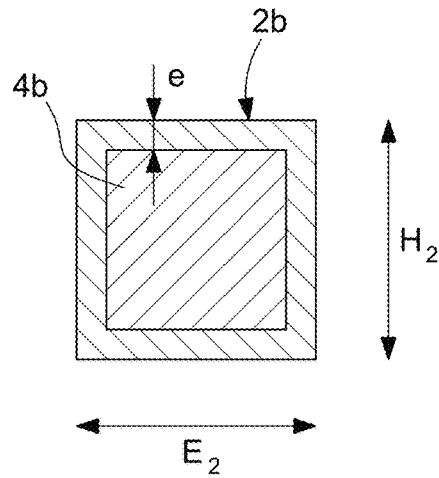
FIG. 4 is a diagrammatic view of a cross-section of a blade of the balance spring formed in the wafer using the method, the cross-section having dimensions greater than the dimensions of the cross-section of the manufactured balance spring blade shown in FIG. 3, according to embodiments of the invention.
Figure 5:
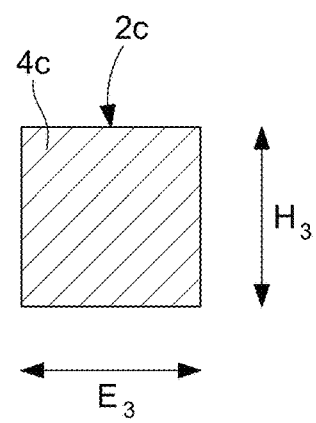
FIG. 5 is a diagrammatic view of a cross-section of a blade of the balance spring formed in the wafer using the method, the cross-section having dimensions smaller than the dimensions of the cross-section of the manufactured balance spring blade shown in FIG. 3, according to embodiments of the invention.

In FIG. 1, a batch of horological balance springs $2b$, $2c$ is formed in a wafer 1. In this batch, each balance spring $2b$, $2c$ comprises a collet intended to be rigidly connected to a pivoting arbor. This horological balance spring $2b$, $2c$ further comprises a resiliently flexible strand connected at one end to the collet and wound in a spiral so as to form a plurality of consecutive turns, the last of which is extended by an attachment segment intended to be attached to a stationary balance cock, for example by means of a stud.

Such a method comprises a step 20 of forming, in the wafer 1, the horological balance springs $2b$, $2c$ with dimensions E, E3, H2, H3 that differ from the dimensions E1, H1 required to obtain the batch of horological balance springs $2a$, the average of whose stiffnesses lies within the predetermined range.

During this step 20, the balance springs $2b$, $2c$ are formed in the wafer 1 of material. These balance springs $2b$, $2c$ are preferably formed simultaneously in this wafer 1. These balance springs $2a$, $2c$ can be formed in the wafer 1 by etching, for example by deep reactive-ion etching, by laser etching, by chemical etching or even by etching using a focused ion beam. It should be noted that these balance springs $2b$, $2c$ preferably have similar geometries.

These balance springs $2b$, $2c$ formed in this wafer 1, have blades with cross-sections $4b$, $4c$ of dimensions E2, H2, E3, H3—characterised by a height H1, H2, H3 and a thickness E1, E2, E3 of this cross-section $4a$, $4b$, $4c$ when such a blade is polygonal in shape—which are different from the dimensions E1, H1 necessary to obtain the batch of horological balance springs $2a$, the average of whose stiffnesses lies within the predetermined range. In other words, the blade of each balance spring $2b$, $2c$ can have a cross-section $4b$, $4c$ whose dimensions E2, H2, E3, H3 are greater than or smaller than the necessary dimensions E1, H1 of the cross-section $4a$ of the blade of the manufactured balance spring $2a$ that allows an average stiffness that lies within the predetermined range to be obtained.

In the context of this method, the wafer 1 is preferably made of doped or undoped silicon. This silicon can be monocrystalline, polycrystalline or amorphous. Moreover, this silicon can be of an orientation $\{1,1,1\}$, $\{-1, 1,1\}$, $\{1,-1,1\}$, $\{-1,-1,1\}$ for which the Young's modulus of the silicon is the greatest. Alternatively, this wafer 1 can be made of quartz, glass, ceramic, metal or alloy.

It should be noted that, during this formation step 20, the horological balance springs $2b$, $2c$ formed can have:

dimensions E2, H2 that are greater than the dimensions E1, H1 required to obtain the batch of horological balance springs $2a$, the average of whose stiffnesses lies within the predetermined range, i.e. a height H2 of the blade and/or a thickness E2 of the blade greater than the height H1 and/or the thickness E1 of the blade of the horological balance springs $2a$, the average of whose stiffnesses lies within the predetermined range;

dimensions E3, H3 that are smaller than the dimensions E1, H1 required to obtain the batch of horological balance springs $2a$, the average of whose stiffnesses lies within the predetermined range, i.e. a height H3 of the blade and/or a thickness E3 of the blade smaller than the height H1 and/or the thickness E1 of the blade of the horological balance springs $2a$, the average of whose stiffnesses lies within the predetermined range.

The method further comprises a step 21 of forming, in the wafer 1, systems for indicating a reference stiffness 3 for determining the stiffnesses of the horological balance springs $2a$, the average whereof lies within the predetermined range. This step 21 is carried out in the same wafer 1 comprising the horological balance springs $2b$, $2c$ formed, preferably simultaneously with the step 20 of forming these balance springs $2b$, $2c$. During this step 21, a system 3 is formed in the wafer 1 for each balance spring $2b$, $2c$ of the batch of horological balance springs formed. This system 3 consists of at least one oscillating element 10 which is arranged in the immediate vicinity of the corresponding balance spring $2b$, $2c$. As with the step 20 of forming the balance springs $2b$, $2c$, the oscillating element 10 of each system 3 is preferably formed by etching. It should be noted that there can be as many systems 3 in this wafer 1 as there are balance springs $2b$, $2c$ and the height of the oscillating element 10 is similar to that of the wafer 1 and thus to that of the balance springs $2b$, $2c$. Alternatively, this wafer 1 can comprise a minimum sample of systems 3 to obtain a good representation of the stiffnesses on this wafer 1.

As already described, this system 3 preferably comprises a plurality of oscillating elements 10. Such an element 10 comprises at least one blade and can extend essentially rectilinearly. This element 10 comprises an attachment end $5a$ and at least one free end $5b$, $5c$. This element 10 has a geometric shape and dimensions that are different from those of a balance spring of this wafer 1, with the exception, of course, of the height as mentioned above.

Each oscillating element 10 is contained within an opening 9 made in the wafer 1. This opening 9 defines a space in which the oscillating element 10 can freely execute a controlled mechanical oscillatory motion.

In particular, this oscillating element 10 comprises an attachment end 5a and two free ends 5b, 5c. This oscillating element 10 comprises a rod/trunk 6 provided with the attachment end 5a. This rod 6 extends rectilinearly into the opening 9 and has, in its extension, two arms 7, 8 forming two flexible blades, or two flexible branches, which are folded along the rod 6. More specifically, such arms 7, 8 are arranged in the opening 9 close to the rod 6 and in this configuration are essentially parallel thereto. These two arms 7, 8 are connected to form the letter "U" and each comprise a free end of the oscillating element 10. It should be noted that these arms 7, 8 can each have a thickness similar or substantially similar to that of the balance spring.

In this oscillating element 10, the rod 6 is stiffer than the two arms 7, 8 from which it is constituted. Furthermore, these arms 7, 8 have a length of between 1 mm and 2 mm, preferably 1.5 mm. These arms 7, 8 have a thickness of between 10 and 60 μm, preferably 30 μm.

Moreover, this oscillating element 10 has the general shape of a tuning fork or is a tuning fork.

As mentioned above, each oscillating element 10 is chosen to allow optimum decoupling of the embedment effect on resonant frequencies. More specifically, during harmonic excitations, there is a non-negligible effect of the embedment on the resonant frequency. In the case of this oscillating element 10, there is a significant decoupling between this embedment and the resonant frequency of the arms 7, 8. The correlation between the resonant frequency and the stiffness becomes independent of the quality of the etching of the embedment.

This is not the case for an oscillating element consisting of a blade with a variable cross-section in its main rectilinear direction and terminating, at its distal end, in a portion of locally enlarged cross-section forming a mass. In such a configuration, the variation in the thickness of the blade leads to a modification of the embedment and thus of the resonance. Correlation here requires the impact of this embedment to be taken into account, which leads to a complexity that is non-existent in the method according to the invention which implements an oscillating element 10 such as a tuning fork. Moreover, this blade is provided with closed corners, the formation of which in a wafer by deep reactive-ion etching requires the implementation of complex operations. In these circumstances, it is understandable that there can be a large variability at each of these corners, which modifies the resonant frequency. By way of example, a variation of the order of 2 μm in the radius of the neck moulding of the embedment results in a difference in the prediction of the etching thickness of the rectilinear blade of the order of 20 nm. Moreover, for this blade and other types of blades that differ from a tuning fork, the manufacturing tolerances of the embedment are an obstacle to obtaining a good frequency-stiffness correlation.

During this step 21, the oscillating elements 10 of each system 3 associated with a balance spring 2b, 2c, are arranged in the wafer 1 at the periphery of this balance spring 2b, 2c and in particular in the immediate vicinity of this balance spring 2b, 2c. Thus, the plurality of oscillating elements 10 of the system 3 is formed in the wafer 1 surrounding the balance spring 2b, 2c with which it is associated.

It should be noted that the arrangement of these oscillating elements 10 of each system 3 in this wafer 1 is preferably such that its arms 7, 8 are placed so that the Young's modulus is at its maximum or minimum, particularly when this wafer 1 is silicon-based. More specifically, as silicon is anisotropic, this arrangement prevents the Young's modulus from varying as a function of the angle when determining the stiffness. Moreover, the maximum Young's modulus is preferred to increase the accuracy of the correlation between stiffness and measured frequency.

It should be noted that during this step 21, said systems 3 are configured so that the average stiffness of the horological balance springs 2b, 2c produced in the wafer 1 lies within the predetermined range.

Moreover, such an oscillating element 10 is configured in such a way that its stiffness can be easily determined using an electronic device for determining the stiffnesses of these systems 3. This electronic device, which is implemented by this method, comprises, in a non-limitative and non-exhaustive manner:

a processing unit such as a computer;
a module for driving/triggering a mechanical oscillatory motion in the body of an oscillating element 10 about its stable equilibrium position;
a module for measuring a resonant frequency of the oscillating element 10 in a mechanical oscillatory motion.

The processing unit of this electronic device comprises at least one processor and memory elements. This processing unit is capable of executing instructions for implementing a computer program intended, for example, to drive/control the drive and measurement modules and also the computing/processing operations during which at least one algorithm, stored in the memory elements, is implemented. This algorithm can include a machine learning algorithm and/or mathematical formulae. This algorithm is able to implement a predictive model or a simulation model allowing the stiffness of a system 3 to be determined from a measurement of its resonant frequency.

It should be noted that such an oscillating element 10 can be likened to a tuning fork in the sense that it vibrates at a stable frequency despite changes in certain parameters linked in particular to the embedment and the manufacturing process. This stable frequency varies according to a single determined parameter, in this case the stiffness.

One of the parameters of the oscillating element 10 causes the resonant frequency to vary significantly, such that the influence of the other parameters is negligible.

The method then comprises a step 22 of determining the stiffnesses of said systems 3 associated with the balance springs 2b, 2c formed in the wafer 1. Such a step 22 comprises a sub-step 23 of estimating at least one resonant frequency of each system 3 associated with its balance spring 2b, 2c. During this sub-step 23, at least one oscillating element 10 of at least one system 3 is driven in a mechanical oscillatory motion about its stable equilibrium position. During this motion, the resonant frequency of this oscillating element 10 is then determined in a measurement phase 24.

In this embodiment of the invention, the resonant frequencies of all of the oscillating elements 10 of the system 3 are measured and an average of these frequencies is then computed to correspond to the resonant frequency of this system 3. In this context, this determined average frequency is considered to be representative of the frequency of each of the oscillating elements 10 of this system 3.

Alternatively, the measured resonant frequency of the system 3 can be a resonant frequency of a single one of its oscillating elements 10 or a resonant frequency of a sample of its oscillating elements 10.

Once the resonant frequency has been estimated, this step 22 comprises a sub-step 25 of defining the stiffness of each system 3, during which sub-step 25, the electronic device executes the algorithm for computing this stiffness from the estimated resonant frequency of the system 3.

The method then comprises a step 26 of computing a dimensional correction to be applied to each balance spring 2b, 2c of the batch of horological balance springs from the stiffness determined for the system 3 associated therewith. During this step 26, a quantification of the dimensional correction to be applied to the balance spring 2b, 2c is then determined.

For this purpose, this step 26 comprises a sub-step 27 of determining, on the basis of this determined stiffness, a thickness e of material to be added to or removed from at least one dimension of the balance spring 2b, 2c of the batch of horological balance springs formed during the formation step 20 in order to obtain the batch of horological balance springs 2a, the average of whose stiffnesses lies within the predetermined range.

This dimensional correction effectively corresponds to a thickness e of material to be removed from or added to the balance spring 2b, 2c in order to vary at least one of its dimensions E2, H2, E3, H3, namely:
the height H2, H3 of its blade only, or
the thickness E2, E3 of this blade only, or
both this height H2, H3 and this thickness E2, E3.

This dimensional correction can be made over one or more distinct lengths of the blade or over the entire length of the blade of this balance spring 2b, 2c.

By determining the dimensional correction, such a sub-step 27 is used to help create a geometry of this balance spring 2b, 2c which will give it a stiffness that lies within the predetermined range.

The method then includes a step 28 of modifying the dimensions E2, E3, H2, H3 of the horological balance springs 2b, 2c on the basis of a dimensional correction computed to obtain the batch of horological balance springs 2a, the average of whose stiffnesses lies within the predetermined range.

In this context, if the dimensions E2, H2 of the balance springs 2b are greater than the dimensions E1, H1 required to obtain the batch of horological balance springs 2a, the average of whose stiffnesses lies within the predetermined range, this step 28 then comprises a material removal sub-step 29 depending on the computed thickness e of material to be removed. Such removal can then be carried out during a process of oxidation and then deoxidation of these balance springs 2b which is well known in the prior art. The purpose of such a sub-step 29 is to reduce the dimensions of the cross-section 4b of the blade of this balance spring 2b over a given length or over the entire length of this blade.

When the dimensions E3, H3 of the balance springs 2c are smaller than the dimensions E1, H1 required to obtain the batch of horological balance springs 2a, the average of whose stiffnesses lies within the predetermined range, this step 28 then comprises a material addition sub-step 30 depending on the computed thickness e of material to be added. Such a material addition can then be carried out during processes well known in the prior art, such as thermal oxidation, galvanic growth, physical vapour deposition, chemical vapour deposition, atomic layer deposition or any other additive process. The purpose of such a sub-step 30 is to increase the dimensions E3, H3 of the cross-section 4c of the blade of this balance spring 2c over a given length or over the entire length of this blade.

A method of this kind thus makes it possible to correct, with the high precision provided by said systems for indicating a reference stiffness 3, the dimensional errors of balance springs manufactured by such methods implementing photolithography and/or DRIE technologies.

NOMENCLATURE

1. Wafer comprising at least one balance spring
2a. Manufactured balance spring
2b. Balance spring formed in the wafer with a cross-section whose dimensions are greater than those of the cross-section of the manufactured balance spring
2c. Balance spring formed in the wafer with a cross-section whose dimensions are smaller than those of the cross-section of the manufactured balance spring
3. System for indicating a reference stiffness
4a. Cross-section of the manufactured balance spring
4b. Cross-section of the formed balance spring whose dimensions are greater than those of the cross-section of the manufactured balance spring
4c. Cross-section of the formed balance spring whose dimensions are smaller than those of the cross-section of the manufactured balance spring
5a. Attachment end of the oscillating element
5b. First free end of the oscillating element
5c. Second free end of the oscillating element
6. Rod/trunk of the oscillating element
7. First flexible arm of the oscillating element
8. Second flexible arm of the oscillating element
9. Opening in which the oscillating element is arranged
10. Oscillating element

The invention claimed is:

1. A method for manufacturing a batch of horological balance springs (2a), comprising an average stiffness within a predetermined range, which method comprises the following steps of:
    a) forming, in a wafer (1), horological balance springs (2b, 2c), of the batch of horological balance springs (2a), with dimensions that differ from dimensions required to obtain the batch of horological balance springs (2a) comprising the average stiffness within said predetermined range;
    b) forming, in the wafer (1), systems (3) for indicating a reference stiffness for determining stiffnesses of the batch of horological balance springs (2a);
    c) determining the stiffnesses of said systems (3) formed;
    d) computing a dimensional correction to be applied to the horological balance springs (2b, 2c) formed, on the basis of the determined stiffnesses of said systems (3); and
    e) modifying the dimensions of the horological balance springs (2b, 2c) formed, on the basis of a dimensional correction computed to obtain the batch of horological balance springs (2a), the average of whose stiffnesses lies within said predetermined range,
    wherein the systems (3) comprise a first system (3) and a second system (3),
    wherein the horological balance springs (2b, 2c) comprise a first horological balance spring (2b, 2c) and a second horological balance spring (2b, 2c), and
    wherein forming, in the wafer (1), the systems (3) comprises:

arranging the first system (3) closer to the first horological balance spring (2b, 2c) than to any other of the horological balance springs (2b, 2c), and arranging the second system (3) closer to the second horological balance spring (2b, 2c) than to any other of the horological balance springs (2b, 2c).

2. The method according to claim 1, wherein forming the horological balance springs (2b, 2c) and forming said systems (3) are carried out by deep reactive-ion etching.

3. The method according to claim 1, wherein forming the systems (3) comprises forming a system (3), of the systems (3), in the wafer (1) and closer to a first one of the horological balance springs (2b, 2c) than to a second one of the horological balance springs (2b, 2c).

4. The method according to claim 1, wherein forming said systems (3) comprises forming, in the wafer (1), a plurality of groups of oscillating elements (10), each group of the groups of oscillating elements (10) constituting each of said systems (3) respectively, and each group surrounding a respective one of the horological balance spring (26, 2c) in the wafer (1).

5. The method according to claim 1, wherein forming said systems (3) comprises forming, in the wafer (1), a plurality of oscillating elements (10) each of which is arranged closer to respective ones of the horological balance spring (2b, 2c) than others of the horological balance springs (2b, 2c).

6. The method according to claim 1, wherein determining the stiffnesses comprises estimating at least one resonant frequency of each of the systems (3).

7. The method according to claim 1, wherein determining the stiffnesses comprises estimating at least one resonant frequency of each of the systems (3) by an electronic device executing an algorithm for computing stiffness on a basis of the resonant frequency.

8. The method according to claim 1, wherein determining the stiffnesses comprises estimating at least one resonant frequency of each of the systems (3) by an electronic device executing an algorithm for computing stiffness on a basis of the resonant frequency, wherein the stiffness is any of a stiffness of an oscillating element (10) of the systems (3), a first average stiffness of all of a plurality of oscillating elements (10) of the systems (3), and a second average stiffness of less than all of the plurality of oscillating elements (10) of the systems (3).

9. The method according to claim 1, wherein the computing the dimensional correction comprises determining, from the stiffnesses of said systems (3), a thickness (e) of material to be added to or removed from at least one dimension of the horological balance spring (2b, 2c) of the batch of horological balance springs (2a).

10. The method according to claim 1, wherein at least one of the systems (3) comprises an oscillating element (10) that is in a shape of a tuning fork.

11. The method according to claim 1, wherein the systems (3) comprise a plurality of first systems (3), including the first system (3), and a plurality of second systems (3), including the second system (3), and wherein forming, in the wafer (1), the systems (3) comprises:

arranging the plurality of first systems (3) closer to the first horological balance spring (2b, 2c) than to any other of the horological balance springs (2b, 2c), and arranging the plurality of second systems (3) closer to the second horological balance spring (2b, 2c) than to any other of the horological balance springs (2b, 2c).

12. The method according to claim 11, wherein the first systems (3) and the second systems (3) each comprise a plurality of oscillating elements (10).

* * * * *